(12) United States Patent
Masuichi

(10) Patent No.: US 7,047,182 B2
(45) Date of Patent: May 16, 2006

(54) MULTILINGUAL DOCUMENT RETRIEVAL SYSTEM

(75) Inventor: Hiroshi Masuichi, Nakai-machi (JP)

(73) Assignee: Fuji Xerox Co., Ltd., Tokyo (JP)

( * ) Notice: Subject to any disclaimer, the term of this patent is extended or adjusted under 35 U.S.C. 154(b) by 918 days.

(21) Appl. No.: 10/013,372

(22) Filed: Dec. 13, 2001

(65) Prior Publication Data

US 2002/0123982 A1  Sep. 5, 2002

(30) Foreign Application Priority Data

Dec. 20, 2000  (JP) .............................. 2000-387960

(51) Int. Cl.
  *G06F 17/28* (2006.01)
  *G06F 17/20* (2006.01)
  *G06F 7/00* (2006.01)
  *G06F 17/00* (2006.01)

(52) U.S. Cl. .............................. 704/7; 704/8; 707/100; 707/101; 715/536

(58) Field of Classification Search .................... None
  See application file for complete search history.

(56) References Cited

U.S. PATENT DOCUMENTS

| | | | | |
|---|---|---|---|---|
| 5,835,912 | A * | 11/1998 | Pet ........................... | 707/104.1 |
| 5,987,402 | A * | 11/1999 | Murata et al. .................. | 704/2 |
| 6,006,221 | A * | 12/1999 | Liddy et al. .................... | 707/5 |
| 6,182,062 | B1 * | 1/2001 | Fujisawa et al. ................ | 707/3 |
| 6,321,189 | B1 * | 11/2001 | Masuichi et al. ............... | 704/7 |
| 6,321,191 | B1 * | 11/2001 | Kurahashi ....................... | 704/8 |
| 6,349,275 | B1 * | 2/2002 | Schumacher et al. .......... | 704/8 |
| 6,381,598 | B1 * | 4/2002 | Williamowski et al. ........ | 707/5 |
| 6,389,387 | B1 * | 5/2002 | Poznanski et al. .............. | 704/9 |
| 6,524,888 | B1 * | 2/2003 | Cokely et al. .............. | 438/108 |
| 6,623,529 | B1 * | 9/2003 | Lakritz ....................... | 715/536 |
| 6,901,361 | B1 * | 5/2005 | Portilla .......................... | 704/8 |
| 2002/0111789 | A1 * | 8/2002 | Hull .............................. | 704/4 |

OTHER PUBLICATIONS

Yoshinga, K. Terano, T. Zhong, Ning. "Multi-lingual Intelligent Information Retriever with Automated Ontology Generator", Knowledge Based Intelligent Information Enginnering System International Conference, Aug. 31, 1999, pp. 62-65.*

Ren, F. Shi, H. "A General Ontology Based Multi-Lingual Multi-Function Multi-Media Intelligent System" Systems, Man and Cybernetics, Oct. 2000, pp. 2362-2368, vol. 4.*

(Continued)

*Primary Examiner*—W. R. Young
*Assistant Examiner*—Matthew J. Sked
(74) *Attorney, Agent, or Firm*—Oliff & Berridge, PLC

(57) ABSTRACT

As a retrieval result, appropriate text of a second language is provided in response to a retrieval request by text of a first language. A first directory storing part stores a first directory structure created for a first language. A second directory storing part stores a second directory structure created for a second language. A directory relation storing part stores correspondences between directories in the first directory structure and directories in the second directory structure. A directory retrieval part receives a retrieval request by the first language from a user and decides which directory in the first directory structure the request has a high degree of relation with. A multilingual retrieval part decides documents having a high degree of relation with the retrieval request, of documents belonging to a directory in the second directory structure that corresponds to the decided directory.

21 Claims, 10 Drawing Sheets

OTHER PUBLICATIONS

Schiel, U. de Sousa, I. Ferneda, E. "SIM-A system for semi-automatic indexing of multilingual documents" Database and Expert Systems, Sep. 1999, pp. 577-581.*

Chau, R. Chung-Hsing, Yeh. "Explorative multilingual text retrieval based on fuzzy multilingual keyword classification" Proceedings of the 5th International Workshop on Information Retrieval with Asian Languages, 2000, pp. 33-40.*

Deerwester et al., "Indexing by Latent Semantic Analysis", Journal of the Society for Information Science 41(6), pp. 391-407.

Dumais et al., "Automatic Cross-Language Retrieval Using Latent Semantic Indexing", proceedings of SIGIR '96-Workshop on Cross-Linguistic Information Retrieval, pp. 16-23, Aug., 1996.

Davis et al., "Query Translation Using Evolutionary Programming for Multi-lingual Information Retrieval", In Proceedings of the Fourth Annual Conference on Evolutionary Programming, Mar. 1995.

Brown et al., "The Mathematics of Machine Translation: Parameter Estimation", Computational Linguistics, vol. 19, No. 2: 19263-311, Jun., 1993.

Berry et al., "SVDPACKC (Version 1.0) User's Guide", Tech. Rep. CS-93-104, 1993, University of Tennessee.

Masuichi et al., "Query Translation Method for Cross Language Information Retrieval", The Proceedings of Machine Translation Summit VII, '99, Workshop on Machine Translation for Cross Language Information Retrieval, (1999).

Masuichi et al., "A Bootstrapping Method for Extracting Bilingual Text Pairs", The Proceedings of the 18th International Conference on Computational Linguistics, pp. 1066-1070 (2000).

* cited by examiner

FIG. 4

(骨董品, ANTIQUES)

(コンピュータ, COMPUTERS)

(土地, REAL ESTATE)

(コインと切手, COINS & STAMPS)

......

(楽器, MUSICAL INSTRUMENTS)

(銀食器, SILVER PLATES)

(家具, FURNITURE)

(絨毯, RUGS)

......

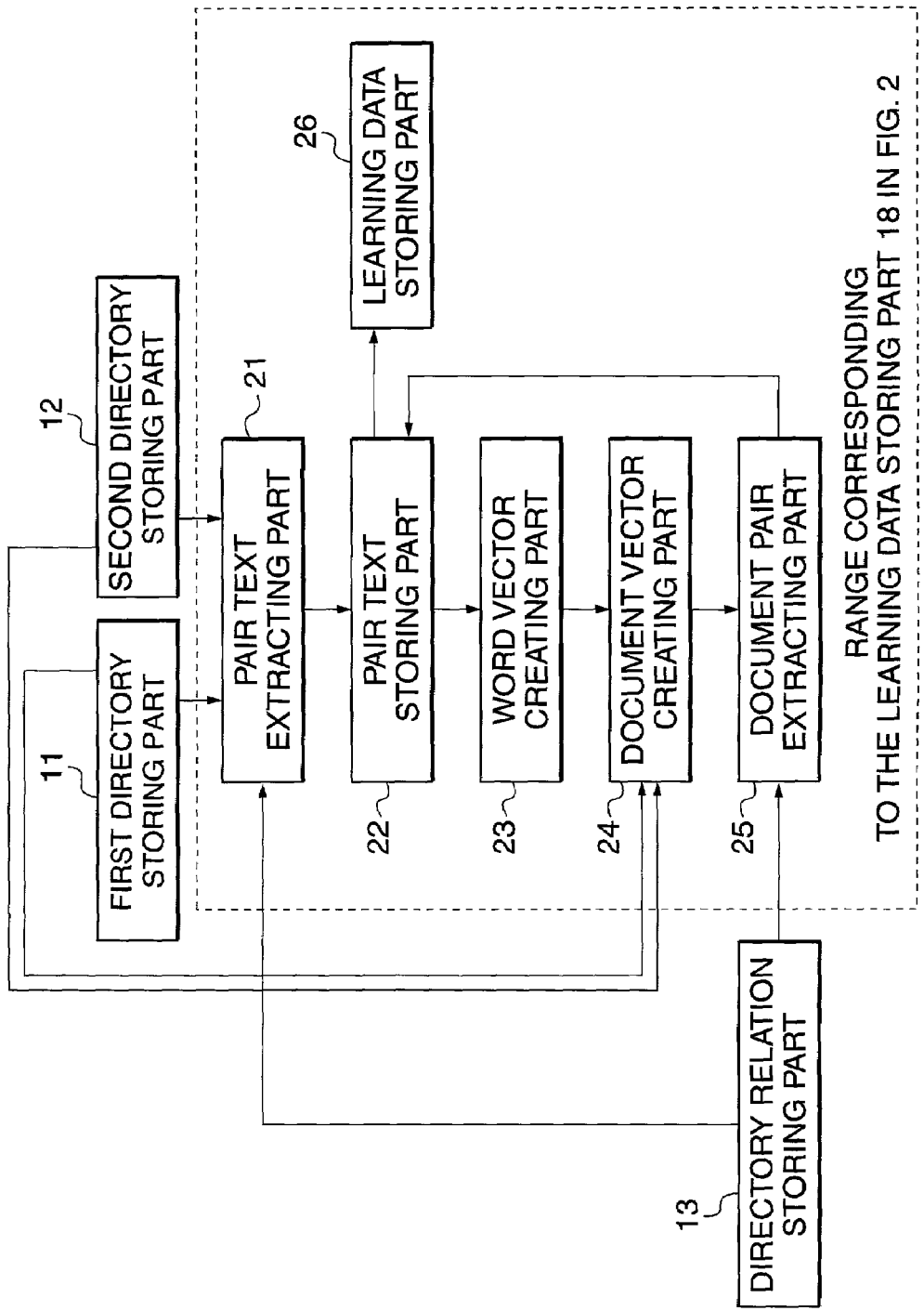

FIG. 7A

| JAPANESE KEYWORD | 自然 | 公園 | 巡り | 目的 |
|---|---|---|---|---|
| CORRE-SPONDING ENGLISH KEYWORD (MEANING) | ·NATURE<br>·NATURAL<br>·UNARTIFICIAL<br>·SPONTANEOUS<br>·AUTOMATIC<br>·NATIVE | ·GARDEN<br>·PARK<br>(AREA OF LAND SET ASIDE FOR PUBLIC USE, AREA WHERE VEHICLES ARE STORED, STADIUM, PLACE OR LEAVE TEMPORARILY)<br>·PLAYGROUND<br>·SQUARE<br>(AREA OF LAND SET ASIDE FOR PUBLIC USE, SOMETHING HAVING AN EQUAL-SIDED RECTANGULAR FORM, THE PRODUCT OBTAINED WHEN A NUMBER OR QUANTITY IS MULTIPLIED BY ITSELF, HAVING 4 EQUAL SIDES AND 4 EQUAL ANGLES, FAIR, CONSERVATIVE, SETTLE, ADAPT, BRIBE) | ·CIRCUIT<br>·FLOW<br>·CIRCULATION<br>·TOUR<br>·PILGRIMAGE<br>·CYCLE | ·DESTINATION<br>·OBJECT<br>·END<br>·GOAL<br>·IDEA<br>·INTENDMENT<br>·INTENT<br>·MEANING<br>·MOTIVE<br>·OBJECTIVE<br>·POINT<br>·PURPOSE<br>·PURPORT<br>·SAKE<br>·SCOPE<br>·TARGET<br>·THRUST<br>·VIEW |

FIG. 7B

| バス | フリー | パス |
|---|---|---|
| ・BASS<br>(THE LOWEST MALE VOICE,<br>FISH FOUND IN BOTH FRESH AND<br>SALT WATER IN NORTH AMERICA<br>[FISH NAME])<br>・BATH<br>(THE ACT OF WASHING OR<br>CLEANING THE BODY WITH WATER,<br>TUB FOR BATHING,<br>WATER FOR BATHING [CHEMISTRY])<br>・BUS<br>(PARALLEL CIRCUIT THAT CONNECTS<br>THE MAJOR COMPONENTS OF<br>A COMPUTER [COMPUTER])<br>・BUS<br>(LARGE AUTOMOBILE HAVING SEATS<br>[VEHICLE],<br>WORK AS A BUSBOY)<br>・MOTORBUS<br>・OMNIBUS<br>・CAMION | ・FREE<br>(NOT UNDER<br>ANY CONTROL,<br>GIVEN WITHOUT<br>PAYMENT,<br>VOLUNTARY,<br>NOT BUSY,<br>RELEASED) | ・PASS<br>(THROW OR KICK A BALL TO ANOTHER<br>PLAYER OF ONE'S OWN TEAM [BALL GAME],<br>FREE TICKET,<br>NARROW WAY OR COURSE,<br>MOVE FROM ONE PLACE TO ANOTHER,<br>GO THROUGH AN EXAMINATION)<br>・TICKET<br>・PASSING<br>(THE ACT OF APPROVING MOTION,<br>LAW, ETC [GOVERNMENT])<br>・CALIPERS<br>(VERNIER MICROMETER [MACHINE])<br>・PAS<br>(PARAAMINO SALYCYLIC ACID [CHEMISTRY])<br>・PATH<br>(WAY MADE BY THE FOOTSTEPS OF PEOPLE<br>OR ANIMALS,<br>LINE ALONG WHICH A PERSON<br>OR THING MOVES,<br>COURSE OF CONDUCT OR ACTION,<br>PATH [COMPUTER]) |

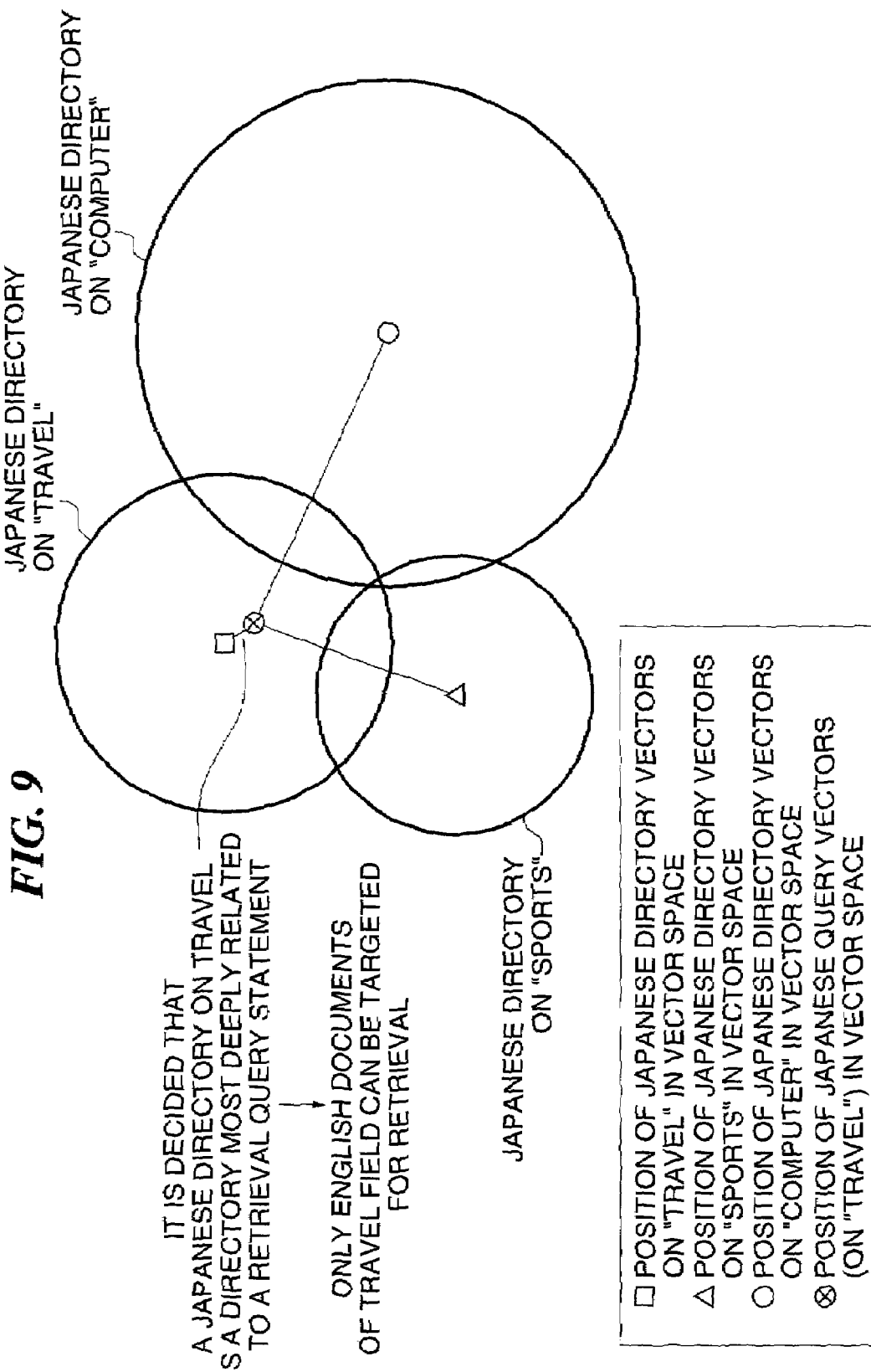

MULTILINGUAL DOCUMENT RETRIEVAL SYSTEM

BACKGROUND OF THE INVENTION

1. Field of the Invention

The present invention relates to a system for retrieving documents stored in a directory structure (hierarchical structure) created on the Internet, and more particularly to a system that performs retrieval across plural directory structures created for different languages.

2. Description of the Related Art

With an upsurge in Internet users, use of the Internet on business is expanding. To facilitate access to high volumes of documents accumulated on WWW servers, directory service is provided which defines a directory structure and stores documents in appropriate directories. According to this service, when a user follows sequentially subdirectories close to his interest from the top directory, a desired document is reached. However, it is impossible for the user to always follow optimum subdirectories, and in most cases, retrieval technologies such as full-text retrieval are also used to increase the chance to reach a desired document.

Numerous multilingual information retrieval methods have heretofore been proposed to perform retrieval across different languages. For example, a method of achieving multilingual information retrieval by applying to a set (parallel corpus) of translation text pairs a method referred to as latent semantic indexing described in detail in "Indexing by latent semantic analysis" written by Deerwester, S., Dumais, S. T., Landauer, T. K., Furnas, G. W. and Harshman, R. A., Journal of the Society for Information Science, 41(6), 391–407 is proposed in "Automatic cross-linguistic information retrieval using Latent Semantic Indexing" written by Dumais, S. T., Landauer, T. K. and Littman, M. L., In proceedings of SIGIR'96 -Workshop on Cross-Linguistic Information Retrieval, pp. 16–23, August 1996. Also, a method proposed in "Query translation using evolutionary programming for multilingual information retrieval" written by Mark W. Davis and Ted E. Dunning, In Proceedings of the Fourth Annual Conference on Evolutionary Programming, March 1995 is a typical example of multilingual information retrieval technology. Further, as described in "The mathematics of statistical Machine Translation: Parameter estimation" written by Peter F. Brown, Stephen A. Della Pietra, Vincent J. Della Pietra, and Robert L. Mercer, Computational Linguistics, 32:263–311, 1993, research has been actively done on methods by which machine translation is achieved by using parallel corpora and a retrieval request statement written in a first language is translated to a second language by the machine translation so that documents written in the second language are retrieved.

However, in the present situation, it is difficult to say that these multilingual information retrieval methods provide sufficient retrieval precision for actual business systems. The main factor in reduction in retrieval precision of multilingual information retrieval is the problem of meaning ambiguities of words or phrases. Generally, many translation candidates exist in translation of a word (phrase) of a first language to a word (phrase) of a second language. For example, the word of the English "base" has various field-dependent translation candidates such as "a supply center for a large force of military personnel" as a military term, "any one of the four corners of an infield" as a baseball term, "a main body for supportive activities" as a political term, "digit" as a mathematical term, "alkali" as a chemistry term, "a morpheme or morphemes regarded as a form to which affixes or other bases may be added" as a linguistic term, and "the main element of a mixture" as a building term. Since these translation candidates are, in most cases, dependent on fields, it is said that, if a retrieval target is limited to a document set of a specific field in multilingual information retrieval, a high precision would be obtained.

In the directory service, in most cases, after the service is started in a specific country and language, a directory structure used therein is transferred to other countries and languages without modification so that the same directory service is offered. However, directory services performed in different countries are independent of each other, so that only documents within a single directory structure can be retrieved and documents within directory structures of other countries and languages cannot be obtained as retrieval results. Particularly in business-oriented directory services such as Internet sales and auction sites, it is important that documents of other countries and languages can be properly retrieved. In the present situation, it can be said that many potential business chances are lost.

SUMMARY OF THE INVENTION

The present invention has been made in view of the above circumstances and provides a multilingual document retrieval system that can achieve retrieval across plural directory structures with high precision.

The present invention uses correspondences of directories between two directory structures created for different languages. Since multilingual information retrieval is performed in a manner that selects a directory having a high degree of relation with a retrieval request from a user and targets for retrieval only a document set belonging to a directory of another language that has a correspondence with the obtained directory, the field of a document set to be targeted for retrieval can be limited, with the result that highly precise multilingual information retrieval can be performed.

BRIEF DESCRIPTION OF THE DRAWINGS

Preferred embodiments of the present invention will be described in detail based on the followings, wherein:

FIG. 4 is a drawing showing an example of correspondences between directories;

FIG. 6 is a drawing showing the configuration of a learning data creating unit according to a first embodiment of the present invention;

FIGS. 7A and 7B are a drawing showing an example of English words corresponding to Japanese words in a Japanese query statement;

FIG. 9 is a schematic diagram showing an example of retrieval operation on related directories in the above-described embodiment.

DESCRIPTION OF PREFERRED EMBODIMENTS

Figure 1:
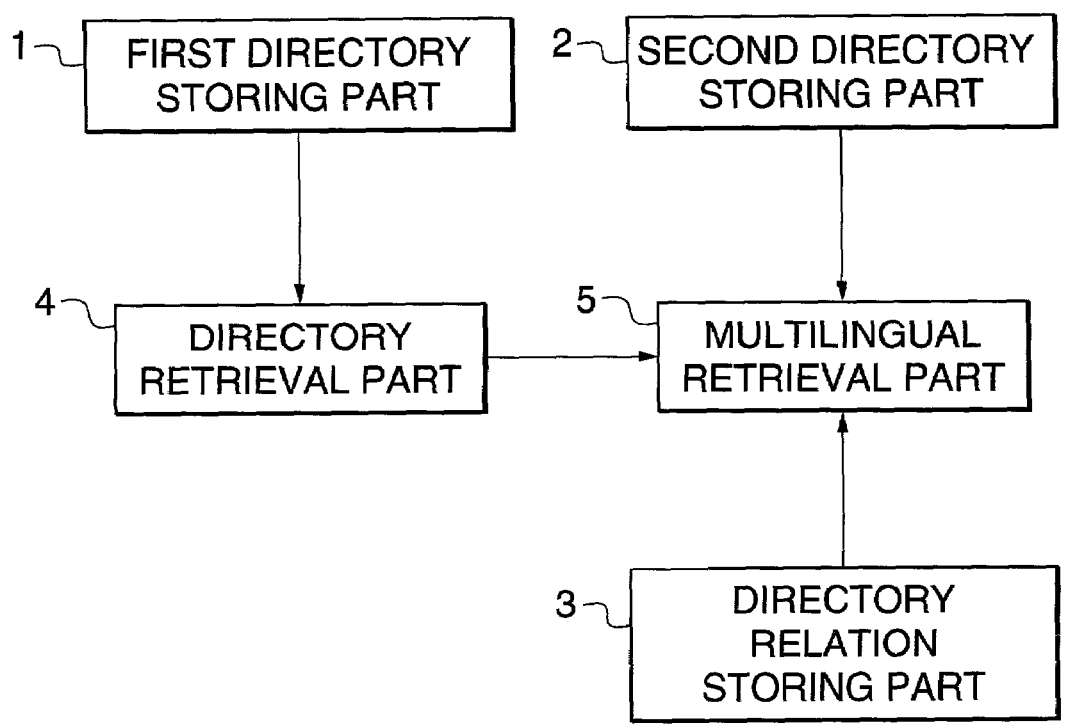
FIG. 1 is a drawing showing the configuration of a typical multilingual information retrieval system of the present invention.

As shown in FIG. 1, as a basic configuration of the present invention, a multilingual retrieval system has: a first directory storing part 1 that stores a first directory structure created for a first language; a second directory storing part 2 that stores a second directory structure created for a second language; a directory relation storing part 3 that stores correspondences between directories in the first directory structure and directories in the second directory structure; a directory retrieval part 4 that decides which directory in the first directory structure a retrieval request by the first language from a user has a high degree of relation with; and a multilingual retrieval part 5 that decides documents having a high degree of relation with the retrieval request by the first language from the user, of documents belonging to a directory in the second directory structure that corresponds to the directory decided by the directory retrieval part.

In this configuration, as described previously, since multilingual information retrieval is performed in a manner that selects a directory having a high degree of relation with a retrieval request from a user and targets for retrieval only a document set belonging to a directory of another language that has a correspondence with the obtained directory, the field of a document set to be targeted for retrieval can be limited, with the result that highly precise multilingual information retrieval can be performed.

In this configuration, in the case where a server in which the first directory is stored and a server in which the second directory is stored are different, the server in which the first directory is stored is provided with a communication part capable of communicating with the server in which the second directory is stored, so that multilingual retrieval is performed via the communication part.

Hereinafter, the present invention will be described in detail using embodiments.

First Embodiment

Figure 2:
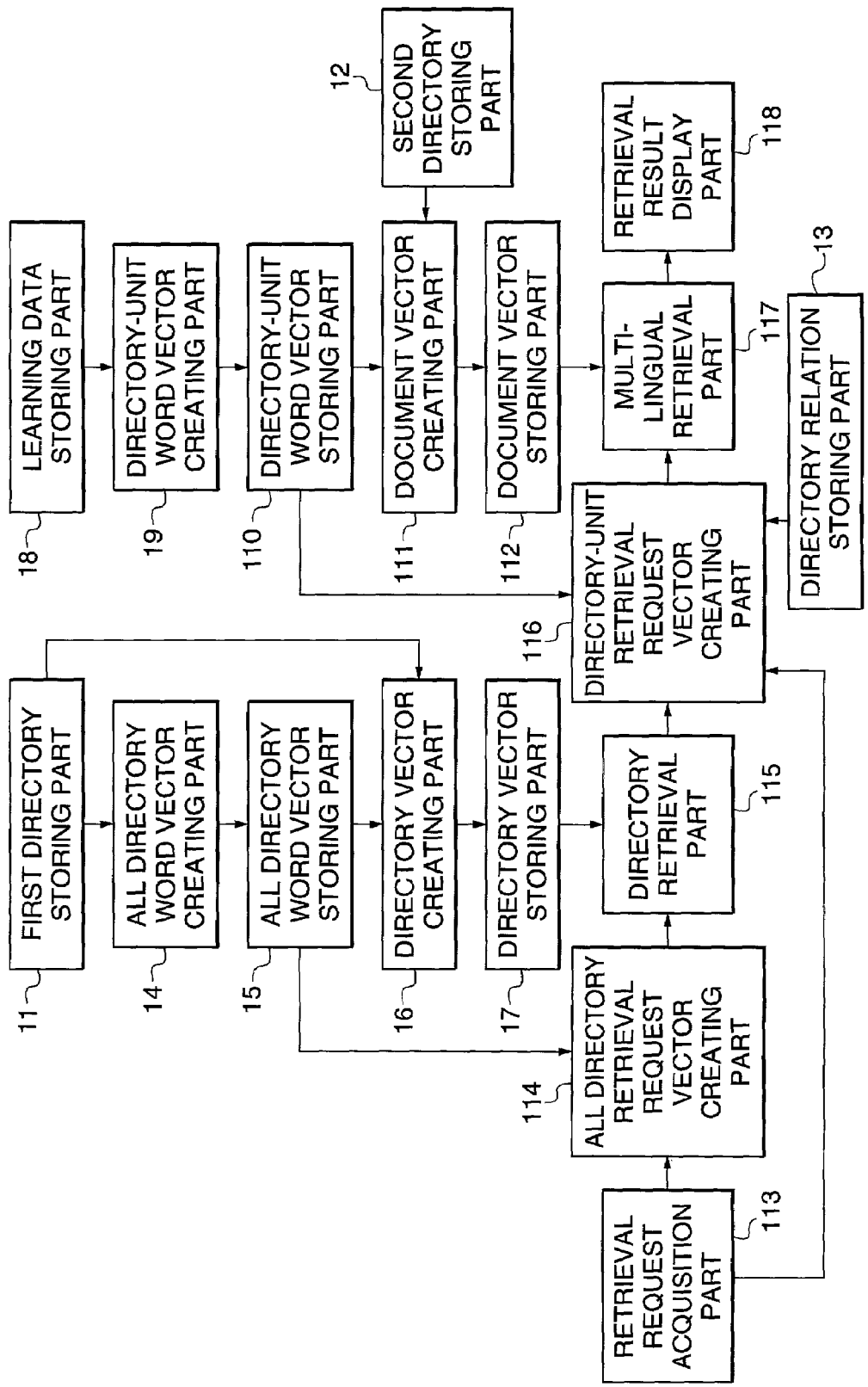
FIG. 2 is a drawing showing the configuration of a multilingual document retrieval system according to a first embodiment of the present invention.

The present invention will be described concretely based on a first embodiment. Referring to FIG. 2, the configuration of a multilingual document retrieval system according to the present embodiment will be described. Although Japanese and English are exemplified in the description of the present embodiment and a second embodiment described later, the same effect can be obtained for any language to which morphological analysis processing (splitting a statement into words) is applicable.

Figure 3:
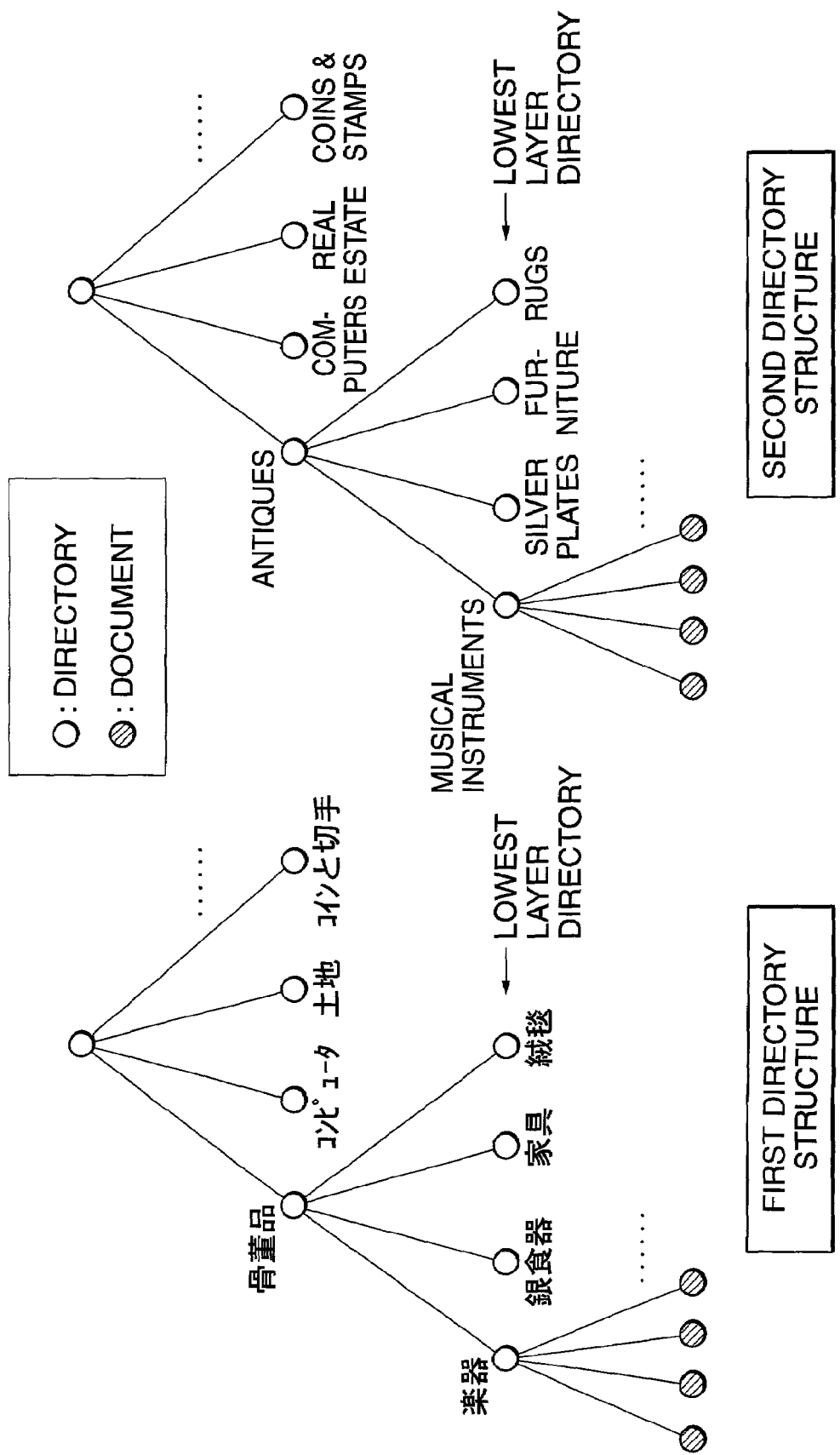
FIG. 3 is a drawing an example of a directory structure.

A first directory storing part 11 and a second directory storing part 12 respectively store, within a computer, directory structures (a first directory structure and a second directory structure) in which plural Japanese documents and plural English documents are stored. Examples of directory structures (examples of auction sites) stored by the both parts are shown in FIG. 3. The directories are assigned unique names (identifiers) according to the contents (fields) of documents stored in the directories. The documents are stored in only directories of the lowest layer.

A directory relation storing part 13 stores correspondences between directories in the first directory structure stored in the first directory storing part 11 and directories in the second directory structure stored in the second directory storing part 12. The correspondences herein means that the fields of document sets in two directories are equal. FIG. 4 shows an example of correspondences stored in the directory relation storing part 13. The present embodiment assumes that the correspondences between directories in the first directory structure stored in the first directory storing part 11 and directories in the second directory structure stored in the second directory storing part 12 are defined one for one, and the structures of the directories are wholly equal. Even when there are some directories the correspondences between which are not defined, exactly the same effect can be obtained for directories the correspondences between which are defined.

An all directory word vector creating part 14 uses, as learning data, all Japanese documents contained in the first directory structure, and for each of all Japanese words contained therein, calculates corresponding multidimensional vectors (word vectors). Hereinafter, an algorithm for calculating word vectors will be described.

<Step S1>: Morphological analysis processing is performed for all Japanese documents contained in the first directory structure.

<Step S2>: Of all Japanese words obtained in step S1, the first n words having the highest frequencies in all Japanese documents contained in the first directory structure are selected. The n words obtained herein are referred to as topic words. The values of n are on the order of several thousands.

<Step S3>: A matrix whose rows and columns respectively correspond to all Japanese words and topic words obtained in step S1 is created. If the total number of different words of the all Japanese words obtained in step S1 is 100 thousand and the value of n is 3,000, a matrix with 100 thousand rows and 3,000 columns would be produced. Each element of the matrix is recorded with the number of times a word corresponding to the row of the element and a topic word corresponding to the column of the element cooccur in the all Japanese documents contained in the first directory structure. For example, if a word "a" and a topic word "b" cooccur in 30 documents, a corresponding matrix element is recorded as 30. A matrix thus obtained will be referred to as a cooccurrence matrix. In this way, n-dimensional vectors can be defined for the all Japanese word contained in the Japanese documents. The vectors can be said as vectors indicating in what context each Japanese word tends to occur.

<Step S4>: The n-dimensional vectors obtained in step S3, because of the large number of dimensions, would require a tremendous amount of calculation time in processing required later. Accordingly, to reduce calculation time to a range of practical time, the original n-dimensional vectors are compressed to n'-dimensional (several hundreds of dimensions) vectors by a matrix dimension compressing technique. Various matrix dimension compressing techniques are available; as a typical example, singular value decomposition is described in detail in "SVDPACKC USER'S GUIDE" written by Berry, M., Do, T., O'Brien, G., Krishna, V. and Varadhan, S. (1993), Tech. Rep. CS-93-104. University of Tennessee, Knoxville, Tenn. n'-dimensional vectors thus obtained for all Japanese words will be referred to as word vectors.

An all directory word vector storing part 15 stores the word vectors corresponding to the all Japanese words calculated by the all directory word vector creating part 14 within the computer.

A directory vector creating part 16 calculates directory levels corresponding to directories in the first directory structure. Hereinafter, an algorithm for calculating directory levels will be described.

\<Step S11>: A document vector corresponding to each of Japanese documents contained in the first directory structure is calculated. The document vector is a vector produced by normalizing (with a vector length of one) the sum total of word vectors corresponding to all words contained in the document.

\<Step S12>: The directory vector of each of directories located at the lowest layer is calculated. The directory vector of a directory located at the lowest layer is a vector produced by normalizing the sum total of document vectors corresponding to all documents contained in the directory.

\<Step S13>: One of directories not located at the lowest layer is found to calculate a directory vector, wherein directory vectors corresponding to all directories contained in the directory are already calculated. The directory vector of a directory not located at the lowest level is a vector produced by normalizing the sum total of directory vectors corresponding to all directories contained in the directory.

\<Step S14>: Step S13 is repeated until the directory vectors of all directories are calculated.

A directory vector storing part 17 stores directory vectors corresponding to all directories calculated by the directory vector creating part 16 within the computer.

Figure 5:
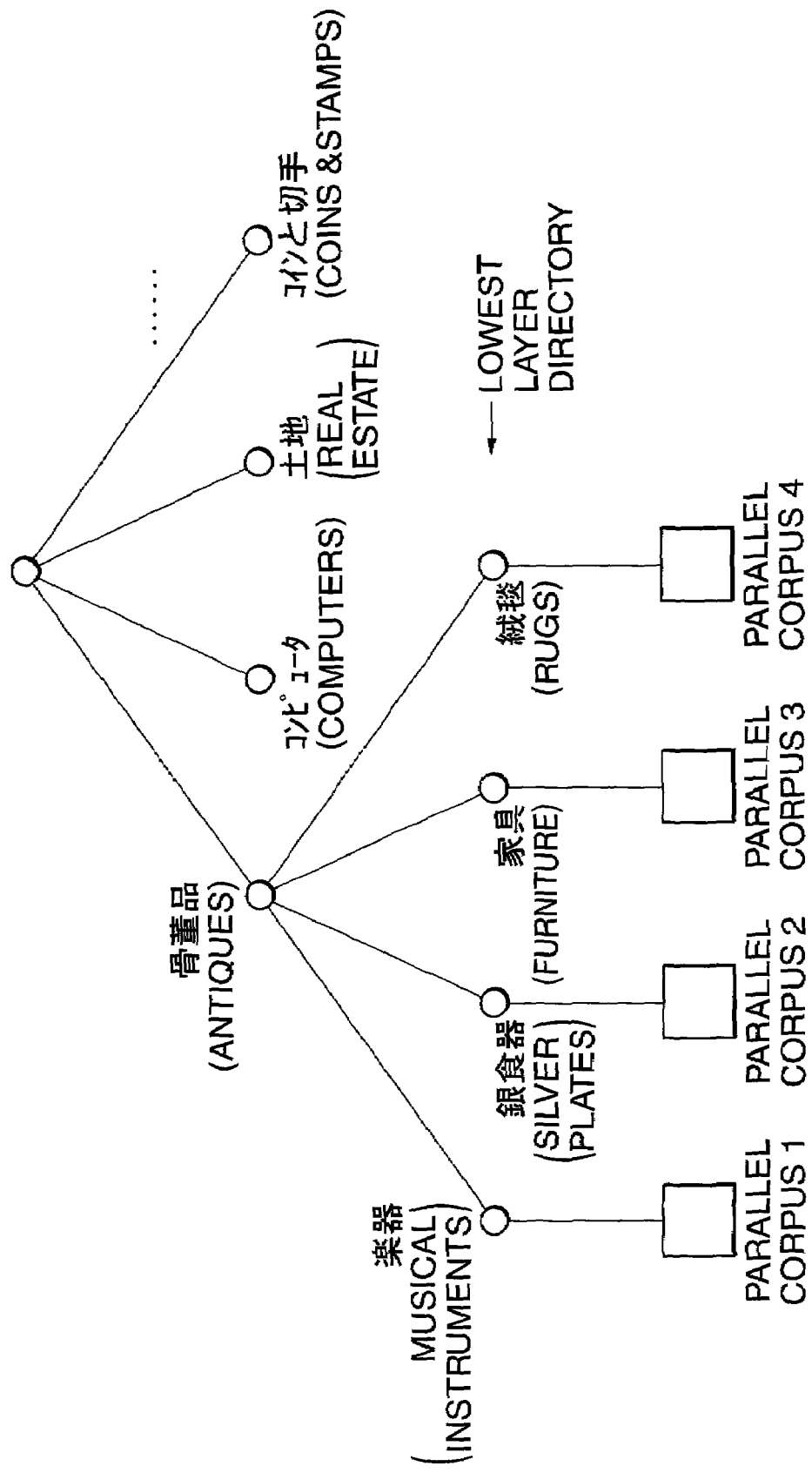
FIG. 5 is a drawing showing an example of storing learning data (parallel corpus)

A learning data storing part 18, for each of directories located at the lowest layer of directories in the first directory structure stored in the first directory storing part 11 (or in the second directory structure stored in the second directory storing part 12), stores a set of Japanese-English translation pairs (Japanese and English parallel corpora) relating to contents of documents contained in the directory (belonging to document' fields) as learning data. An example of learning data by the learning data storing part 18 is shown in FIG. 5.

A directory-unit word vector creating part 19 uses Japanese and English parallel corpora stored in the learning data storing part 18 as learning data to respectively calculate word vector sets limited to the meanings and contents of directories in the first directory structure (the meanings and contents of directories in the second directory structure). Hereinafter, a description will be made of an algorithm for calculating a word vector set corresponding to a given directory (directory A).

\<Step S21>: All Japanese and English parallel corpora stored in the learning data storing part 18, correspondingly to all directories of the lowest layer contained in the directory A (or the directory A itself if it is located at the lowest layer) are collectively regarded as learning data, and morphological analysis processing is performed for all Japanese documents and English documents contained in the learning data. In an example shown in FIG. 5, if the directory A is "Antiques" directory, parallel corpora 1 to 4 are collectively regarded as learning data.

\<Step S22>: Of all Japanese words and all English words obtained in step S1, the first n words having the highest frequencies in the learning data are selected. The n words obtained herein are referred to as topic words, like step S2. However, in this case, the topic words include Japanese words and English words cooccur. The values of n are on the order of several thousands, like step S2.

\<Step S23>: A cooccurrence matrix whose rows and columns respectively correspond to all Japanese words obtained in step S1 or English words, and topic words is created. Each element of the matrix is recorded with the number of times a word corresponding to the row of the element and a topic word corresponding to the column of the element cooccur in the all Japanese-English translation pairs contained in the learning data. In other words, the Japanese-English translation pairs are regarded as one document to count the number of cooccurrences. In this way, a cooccurrence matrix in which all Japanese words and all English words are expressed by n-dimensional vectors can be created. The vectors can be said as vectors indicating occurrence tendencies of individual words, according to the meaning and contents (fields) of the directory A.

\<Step S24>: The n-dimensional vectors obtained in step S23 are compressed to n'-dimensional (several hundreds of dimensions) vectors by the matrix dimension compressing technique, like step S4. In this way, for all Japanese/English words, n'-dimensional word vectors comparable with each other on the same vector space are obtained.

By applying calculations based on the above algorithm to all directories in the first directory structure (that is, all directories in the second directory structure), word vector sets limited to the meanings and contents of the directories in the directory structure can be respectively calculated.

A directory-unit word vector storing part 110 stores the word vector sets calculated by the directory-unit word vector creating part 19 on a directory basis.

A document vector creating part 111, for each of all directories in the second directory structure stored by the second directory storing part 12, calculates document vectors of English documents belonging to the directory. For a given directory A, document vectors of English documents belonging to the directory A are calculated using a word vector set stored correspondingly to the directory A in the directory-unit word vector storing part 110. Herein, the calculation is performed on the assumption that a document vector of each English document is a vector produced by normalizing the sum total of word vectors corresponding to all English words contained in the document. In this way, for directories in the second directory structure, document vector sets limited to the meanings and contents (fields) of the directories can be calculated.

A document vector storing part 112 stores the document vector sets calculated by the document vector creating part 111 for each of the directories in the second directory structure.

A retrieval request acquisition part 113 has a user interface through which retrieval requests by Japanese text from users can be received. Received retrieval requests are subjected to morphological analysis processing and split into Japanese words.

An all directory retrieval request vector creating part 114 calculates retrieval request vectors corresponding to retrieval requests from users received by the retrieval request acquisition part 113. The retrieval request vectors are created by normalizing the sum total of word vectors corresponding to all Japanese words contained in retrieval request text, using word vector sets stored in the all directory word vector storing part 15.

A directory retrieval part 115 decides which directory in the first directory structure a retrieval request from a user received by the retrieval request acquisition part 113 has the highest degree of relation with. To make the decision, the directory retrieval part 115 calculates a relation degree between retrieval request vectors calculated by the all directory retrieval request vector creating part 114 and directory vectors stored in the directory vector storing part 17 and selects a directory having the highest degree of relation. Inner products between vectors (cosine values) are used as the definition of relation degrees. Therefore, a relation degree is expressed with a real number between 0 and 1, and the smaller the angle between two vectors, the closer the cosine value is to 1.

A directory-unit retrieval request vector creating part 116 calculates a retrieval request vector limited to the field of a directory, calculated by the directory retrieval part 115, as having the highest degree of relation with a retrieval request. First, a directory in the second directory structure corresponding to the directory in the first directory structure obtained from the directory retrieval part 115 is decided by referring to the directory relation storing part 13. Next, a word vector set corresponding to the directory is obtained from the directory-unit word vector storing part 110. Using the obtained word vector set, a vector produced by normalizing the sum total of word vectors corresponding to all Japanese words contained in the retrieval request text is calculated as a new retrieval request vector.

A multilingual retrieval part 117 calculates a relation degree between the retrieval request vector calculated by the directory-unit retrieval request vector creating part 116, and a document vector stored in the document vector storing part 112, correspondingly to a directory decided by the directory retrieval part 115. The definition of relation degrees is the same as the definition in the directory retrieval part 115. The retrieval request vector is a vector for Japanese text, while the document vector stored in the document vector storing part 112 is a vector for an English document. However, the vectors are comparable with each other because any of them is a vector calculated as the sum of vectors in the directory-unit word vector storing part 110, expressed on an identical vector space.

A retrieval result display part 118 refers to the relation degree between the retrieval request vector and individual document vectors, calculated by the multilingual retrieval part 117, and presents a document corresponding to a document vector having a high degree of relation (large inner product of vectors) with the retrieval request vector to the user as a retrieval result.

Although, in this embodiment, a directory having a high degree of relation with the retrieval request from the user is automatically by the directory retrieval part 115, a directory having a high degree of relation may be manually decided by the user following the directory structure.

The multilingual document retrieval apparatus configured as described above can provide related English documents as retrieval results in response to a retrieval request by Japanese text and can solve the above-described problem.

By using a correspondence between the first directory structure for Japanese documents and the second directory structure for English documents, (1) only English documents of fields having a high degree of relation with a retrieval request can be targeted for retrieval, and further, (2) learning data of fields having a high degree of relation with a retrieval request can be used for retrieval. The two effects of field limitation will contribute to solving the problem of word meaning ambiguities (meanings are different depending on fields) that has conventionally caused reduction in the precision of multilingual information retrieval, remarkably increasing the retrieval precision of multilingual document retrieval.

Although, in this embodiment, parallel corpora are provided for directories of the lowest layer, since the above effect (1) can be obtained even if multilingual document retrieval is performed without using learning data limited to specific fields as in one configuration of the present invention, more precise retrieval can be performed in comparison with conventional multilingual document retrieval.

Furthermore, even in the case where multilingual document retrieval is performed without using learning data limited to specific fields, multilingual information retrieval limited to specific fields can be performed using a document set (hereinafter referred to as document set D) contained in pairs of directories in the first directory storing part and directories in the second directory storing part, the correspondences between the directories being stored by the directory relation storing part. Hereinafter, a method for achieving this will be described.

The same configuration shown in FIG. 2 will be used. However, since learning data is not provided for each field (for each of directories of the lowest layer), the learning data storing part 18 stores only one set of Japanese and English parallel corpora used in common when the directory-unit word vector creating part 19 creates a word vector set corresponding to each directory.

Accordingly, the directory-unit word vector creating part 19, when creating a word vector set corresponding to each directory, always uses the above common parallel corpora as learning data in step S21. Each element of the cooccurrence matrix created in step S23 is not a cooccurrence count of a word and a topic word but a weighted cooccurrence count using $\chi^2_u$ defined in expression 1. $\chi^2_u$ defined in expression 1 is a weight for a word $w_u$ (significance of word $w_u$ in the field of directory A), and the weighted cooccurrence count is a value producing by multiplying the cooccurrence count of word $w_{u1}$ and topic word $w_{u2}$ by $\chi^2_{u1}$ and $\chi^2_{u2}$. The $\chi^2_u$ is a value used in a technique generally called $\chi^2_u$ inspection and has a high value for an element exhibiting a different occurrence tendency between a whole set and its subset.

[Expression 1]
$$X_u^2 = \sum_{v=1}^{L} \frac{(g_{uv} - h_{uv})^2}{h_{uv}} \text{ where}$$

$$h_{uv} = \frac{\sum_{v=1}^{L} g_{uv}}{\sum_{u=1}^{M}\sum_{v=1}^{L} g_{uv}} \times \sum_{u=1}^{M} g_{uv}$$

M: Number of all different words
L: Number of directories at the same level as directory A
$g_{uv}$: Number of occurrences of word $w_u$ in directory v A word vector set for each directory obtained in this way is a word vector set limited to the field of the directory. Therefore, since the above effects (1) and (2) can be obtained even if multilingual document retrieval is performed without using learning data limited to specific fields as in one configuration of the present invention, more precise retrieval can be performed in comparison with conventional multilingual document retrieval.

The multilingual document retrieval technique used in this embodiment is described in a literature "Query Translation Method for Cross Language Information Retrieval" written by Hiroshi Masuichi, Raymond Flournoy, Stefan Kaufmann and Stanley Peters, The Proceedings of Machine Translation Summit VII '99 Workshop on Machine Translation for Cross Language Information Retrieval, (1999).

Second Embodiment

A second embodiment of the present invention will be described. The present embodiment is different from the first embodiment only in the configuration of the learning data storing part 18. Therefore, the following description is on only portions related to the learning data storing part 18. FIG. 6 is a drawing showing the configuration of this embodiment in a range corresponding to the learning data storing part 18 in FIG. 2. Other components are the same as those in FIG. 2.

The first directory storing part 11, the second directory storing part 12, and the directory relation storing part 13 have the same functions as those in FIG. 2. However, in the present embodiment, documents stored in the first directory storing structure and the second directory storing structure are web documents; in the first directory structure, documents written in Japanese are mainly stored but documents written in English are also stored; and in the second directory structure, documents written in English are mainly stored but documents written in Japanese are also stored. However, English words obtained by subjecting all documents in the first directory structure to a morphological analysis are treated like Japanese words, and Japanese words obtained by subjecting all documents in the second directory structure to a morphological analysis are treated like English words, whereby processing can be performed without changing the algorithms of the parts described in the first embodiment.

The following description of parts 21 to 26 is targeted for a lowest layer directory A in the first directory structure and a lowest layer directory A' in the second directory structure, corresponding to the directory A. Therefore, for all lowest layer directories in the directory structures, the same processing must be respectively repeated.

A pair text extracting part 21, from all web documents belonging to the lowest layer directory A in the first directory structure and the lowest layer directory A' in the second directory structure, corresponding to the directory A, extracts pairs of translation text in web documents subjected to Japanese-English translation, using technologies such as an existing document collecting robot.

A pair text storing part 22 stores a set of Japanese-English translation text pairs obtained by the pair text extracting part 21, and Japanese-English document pairs obtained by a document pair extracting part 25 within the computer. When a preset number of Japanese-English pairs (pairs of translation text and pairs of Japanese-English documents) have been stored in the part, the Japanese-English pair set is passed to the learning data storing part.

A word vector creating part 23 uses the Japanese-English pairs stored in the pair text storing part 22 as learning data to calculate word vectors by using the same algorithm as the directory-unit word vector creating part 19 in the first embodiment.

A document vector creating part 24 uses a word vector set obtained from the word vector creating part 23 to calculate document vectors corresponding to all documents belonging to the directory A and the directory A'. The document vectors are calculated by normalizing the sum total of word vectors corresponding to all Japanese/English words contained in documents. A document pair extracting part 25 extracts pairs of Japanese documents and English documents satisfying the following condition from all document sets belonging to the directory A and the directory A' by referring to the document vectors obtained from the document vector creating part 24.

"English document vectors having the highest degree of relation (a large value of inner product) with document vectors corresponding to Japanese documents in the pairs are English document vectors in the pairs and Japanese document vectors having the highest degree of relation with English document vectors in the pairs are Japanese document vectors in the pairs."

Next, of Japanese/English document pairs satisfying the above condition, pairs that the value of inner product between Japanese/English document vectors corresponding to Japanese/English documents in the pairs is greater than a preset threshold value are extracted. Pairs of Japanese and English document obtained in this way are extremely close to each other in meaning and contents and can be used as learning data. The obtained pairs are stored in the pair text storing part 22 along with the set of Japanese/English translation text pairs obtained by the pair text extracting part 21.

A learning data storing part 26 stores the Japanese/English pair set passed from the pair text storing part within the computer.

In this configuration, by repeating the following steps, the number of pairs of the Japanese/English pair set stored in the pair text storing part 22 can be gradually increased:

(1) using the Japanese/English pair set stored in the pair text storing part 22 to create a word vector set by the word vector creating part 23;

(2) creating a document vector set by the document vector creating part 24;

(3) extracting pairs of Japanese and English documents extremely close to each other in meaning and contents by the document pair extracting part 25; and (4) adding the obtained document pairs to the pair text storing part 22 (replacing old ones by new ones).

By using such a repeat method, even if the number of pieces of pair text obtained from the pair text extracting part 21 is small, learning data sufficient for practical use can be obtained. Such a repeat method is described in detail in "A Bootstrapping method for Extracting Bilingual Text Pairs" written by Hiroshi Masuichi, Raymond Flournoy, Stefan Kaufmann and Stanley Peters, The Proceedings of The 18th International Conference on Computational Linguistics, pp. 1066–1070 (2000). This repeat method is effective only when the fields of a document set from which to extract pairs are limited. In the present embodiment, the repeat method is applicable by using correspondences between the first directory structure and the second directory structure to limit the fields of document set.

Processing after learning data has been obtained in this way is exactly the same as processing of the first embodiment. In the example of the first embodiment, it was necessary to in advance prepare learning data for each of the lowest layer directories. On the other hand, a multilingual document retrieval apparatus having a configuration of the present embodiment extracts translation text pairs in web documents subjected to Japanese-English translation from web documents and uses them as initial learning data, and further develops them by the above-described repeat method, whereby learning data necessary for multilingual document retrieval can be automatically created.

The learning data (bilingual document pairs) can be used as a parallel corpus. As described in the above-described literature "A Bootstrapping method for Extracting Bilingual Text Pairs" written by Hiroshi Masuichi, Raymond Flournoy, Stefan Kaufmann and Stanley Peters, The Proceedings of The 18th International Conference on Computational Linguistics, pp. 1066–1070 (2000), a parallel corpus is presently in shortage though it is a valuable language resource to achieve a multilingual information retrieval system or machine translation system. It can be said that a method for creating learning data for each field as described in the present embodiment, which can be achieved by using correspondences between two directory structures, is an extremely useful method for solving the problem of parallel corpora in shortage.

Although the first and second embodiments have been described using examples that documents are stored only in directories of the lowest layer, even in the case where documents are stored in directories of other than the lowest layer, by handling document vectors corresponding to the documents as if they were directory vectors, exactly the same processing can be performed. Furthermore, although, in the first and second embodiments, directory structures of tree structure are used for description, also for directory structures of network type in which each of the directories has plural parent directories, the same processing can be performed.

By in advance translating retrieval requests or documents instead of performing the multilingual document retrieval method, retrieval between different languages is also feasible. As an example that a machine translation system is implemented using parallel corpora as learning data, the literature "The mathematics of statistical Machine Translation: Parameter estimation" written by "Peter F. Brown, Stephen A. Della Pietra, Vincent J. Della Pietra, and Robert L. Mercer, Computational Linguistics, 32:263–311, 1993" can be quoted.

A multilingual retrieval method does not directly perform multilingual document retrieval but can in advance extract bilingual document pairs. As the extracting method, the learning data creating method described in the second embodiment can be used without modification.

Hereinafter, the effects of the above-described embodiments will be confirmed using concrete examples. Consider the following situation. In a retrieval site, a sales site, or an auction site on the Internet, a user uses a Japanese retrieval query statement "自然公園巡りを目的とするバスのフリーパス" (expressed in English as "bus free pass intended for natural park tour") to access information written in English and obtain bus free pass information or purchase a free pass. In this case, a typical multilingual document retrieval system first extracts keywords "自然", "公園", "巡り", "目的", "バス", "フリー", and "パス" from the above query statement and replaces the Japanese keywords by corresponding English keywords, using a Japanese/English translation dictionary. An example of corresponding English keywords is shown in FIGS. 7A and 7B. Plural English keywords exist correspondingly to each Japanese keyword, and each of the English keywords may have plural different meanings in English context. English keywords corresponding to Japanese keyword "パス" include "pass", "passing", "calipers (vernier micrometer) [machine term]", "PAS (para-aminosalicylic acid [chemistry])", "path", etc., and further, e.g., "pass" is used in different meanings in English context such as "throw or kick a ball to another player of one's own team [ball game]", "free ticket", "narrow way or course", "move from one place to another", and "go through an examination." Therefore, as a result of search for English documents by these English keywords, the following numerous documents would be obtained against a retrieval intention:

(1) Documents on soccer including "free kick", "goal", "pass", etc. as important words
(2) Documents on baseball including "square", "ball park", "ticket", etc. as important words
(3) Documents on chemistry including "para-aminosalicylic acid (PAS)", "free acid", etc. as important words
(4) Documents on computer including "computer bus", "free access", "path analysis", "circuit", etc. as important keywords
(5) Documents on "bass fishing tour", and
(6) Documents on "free calipers."

Figure 8:
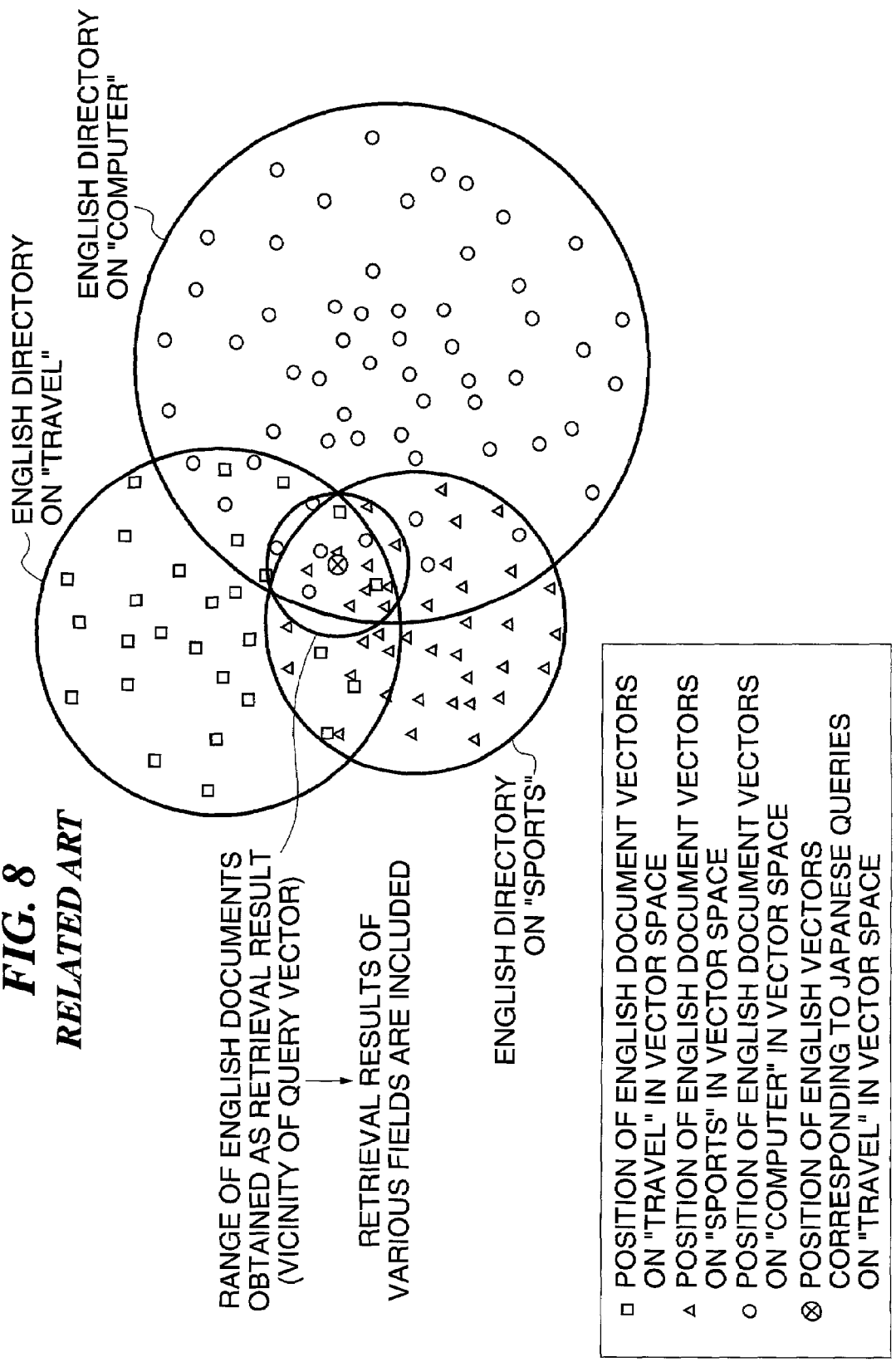
FIG. 8 is a schematic diagram showing an operation example of a typical multilingual information retrieval system.

FIG. 8 is a schematic view showing this situation, represented based on an example of a system configuration based on a vector space method. Because of meaning ambiguities of words, English document vectors close in distance to an English vector obtained by replacing the Japanese retrieval query by corresponding English words spread to various fields, with the result that the precision of obtained retrieval results would be extremely low. Thus, achieving multilingual information retrieval with high precision is extremely difficult, compared with information retrieval of a single language.

In the multilingual information retrieval system of the above-described embodiment, first, only Japanese words are targeted to retrieve directories having the highest degree of relation with the retrieval query statement (see FIG. 9). In this case, since word meaning ambiguities resulting from spreading to the two languages of Japanese and English need not be considered, related directories can be obtained with high precision. (It is easy to determine from the target of only Japanese words that the query statement "bus free pass intended for natural park tour" is a retrieval request of travel field.) Thereafter, by targeting English directories corresponding to the obtained Japanese directories to retrieve English documents, retrieval results different from a retrieval intention can be excluded. Furthermore, as described in the embodiments, by performing multilingual information retrieval using learning data corresponding to directories having the highest degree of relation with a retrieval request, more precise multilingual retrieval can be performed.

According to the present invention as described above, for a retrieval request by text of a first language, documents of an appropriate second language can be obtained as retrieval results, solving the above problem.

Specifically, by using correspondences between a first directory structure for documents of the first language and a second directory structure for documents of the second language, (1) only documents of the second language belonging to fields having a high degree of relation with the retrieval request can be targeted for retrieval, and further, (2) learning data of fields having a high degree of relation with the retrieval request can be used for retrieval. The two effects of field limitation will contribute to solving the problem of word meaning ambiguities (meanings are different depending on fields) that has conventionally caused reduction in the precision of multilingual information retrieval, remarkably increasing the retrieval precision of multilingual document retrieval.

Further, by using correspondences between the first directory structure and the second directory structure, learning data of multilingual document retrieval can be automatically created.

According to the present invention as described above, for a retrieval request by text of a first language, appropriate documents of an second language can be obtained as retrieval results, and other effects can be obtained.

The above-described aspect and other aspects of the present invention are as described in the scope of claims and will be described in detail below.

It goes without saying that the present invention can be implemented not only as a system and an apparatus but also by an embodiment of a method, and can be implemented as storing a media storing a part of the present invention as a computer program.

It goes without saying that the present invention can be implemented as a retrieval server and a part of the present invention may be installed in a client apparatus.

The entire disclosure of Japanese Patent Application No. 2000-387960 filed on Dec. 20, 2000 including specification, claims, drawings and abstract is incorporated herein by reference in its entirety.

What is claimed is:

1. A multilingual document retrieval system, comprising:
    a first directory storing unit that stores a first directory structure created for a first language;
    a second directory storing unit that stores a second directory structure created for a second language;
    a directory relation storing unit that stores a correspondence between a directory in the first directory structure and a directory in the second directory structure;
    a directory retrieval unit that decides which directory in the first directory structure has a high degree of relation with a retrieval request by the first language from a user, and the decision includes information related to levels within the first directory structure; and
    a multilingual retrieval unit that decides a document having a high degree of relation with the retrieval request by the first language from the user among documents belonging to a directory in the second directory structure that corresponds to the directory decided by the directory retrieval unit.

2. The multilingual document retrieval system according to claim 1, comprising:
    a learning data storing unit that stores, for each of pairs of corresponding directories stored in the directory relation storing unit, multilingual retrieval learning data that includes dictionary data of a field of the directory pair and a translation pair,
    wherein the multilingual retrieval unit decides a document having a high degree of relation with the retrieval request by the first language from the user among documents belonging to a directory in the second directory structure that corresponds to the directory decided by the directory retrieval unit, using corresponding learning data stored in the learning data storing unit.

3. The multilingual document retrieval system according to claim 1, comprising:
    a learning data storing unit that extracts a pair of a text by the first language and a text by the second language from a document having the text pair among documents belonging to the pair of corresponding directories stored in the directory relation storing unit, and stores the text pair as multilingual retrieval learning data,
    wherein the multilingual retrieval unit decides a document having a high degree of relation with the retrieval request by the first language from the user among documents belonging to a directory in the second directory structure that corresponds to the directory decided by the directory retrieval unit, using corresponding learning data stored in the learning data storing unit.

4. A multilingual document retrieval system, comprising:
    a first directory storing unit that stores a first directory structure created for a first language;
    a second directory storing unit that stores a second directory structure created for a second language;
    a directory relation storing unit that stores a correspondence between a directory in the first directory structure and a directory in the second directory structure;
    a multilingual retrieval unit that retrieves a pair of a document by the first language and a document by the second language that have a relation with each other from the pair of corresponding directories stored in the directory relation storing unit, and a retrieval decision includes information related to levels within the first directory structure or the second directory structure; and
    a retrieval unit that decides which document in the first directory structure has a relation with a retrieval request by the first language from a user.

5. The multilingual document retrieval system according to claim 4, comprising:
    a learning data storing unit that stores, for each of pairs of corresponding directories stored in the directory relation storing unit, multilingual retrieval learning data that includes dictionary data of a field of the directory pair and a translation pair,
    wherein the multilingual retrieval unit retrieves the pair of document by the first language and document by the second language that have a relation with each other from the pair of corresponding directories stored in the directory relation storing unit, using corresponding learning data stored in the learning data storing unit.

6. The multilingual document retrieval system according to claim 4, comprising:
    a learning data storing unit that extracts a pair of a text by the first language and a text by the second language from a document having the text pair among documents belonging to the pair of corresponding directories stored in the directory relation storing unit, and stores the text pair as multilingual retrieval learning data,
    wherein the multilingual retrieval unit retrieves the pair of document by the first language and document by the second language that have a relation with each other from the pair of corresponding directories stored in the directory relation storing unit, using corresponding learning data stored in the learning data storing unit.

7. A multilingual document retrieval system, comprising:
    a first directory storing unit that stores a first directory structure created for a first language;
    a second directory storing unit that stores a second directory structure created for a second language;
    a directory relation storing unit that stores a correspondence between a directory in the first directory structure and a directory in the second directory structure;
    a directory retrieval unit that decides which directory in the first directory structure has a high degree of relation with a retrieval request by the first language from a user, and the decision includes information related to levels within the first directory structure;
    a translation unit that translates the retrieval request by the first language from the user to a retrieval request by the second language; and
    a retrieval unit that decides a document having a high degree of relation with the retrieval request by the second language obtained by the translation unit among documents belonging to a directory in the second directory structure that corresponds to the directory decided by the directory retrieval unit.

8. The multilingual document retrieval system according to claim 7, comprising:
    a learning data storing unit that stores, for each of pairs of corresponding directories stored in the directory relation storing unit, multilingual retrieval learning data that includes dictionary data of a field of the directory pair and a translation pair, wherein the translation unit translates the retrieval request by the first language from the user to a retrieval request by the second language, using the learning data stored in the learning data storing unit, the learning data corresponding to the directory obtained by the directory retrieval unit.

9. The multilingual document retrieval system according to claim 7, comprising:

a learning data storing unit that extracts a pair of a text by the first language and a text by the second language from a document having the text pair among documents belonging to the pair of corresponding directories stored in the directory relation storing unit, and stores the text pair as multilingual retrieval learning data, wherein the translation unit translates the retrieval request by the first language from the user to a retrieval request by the second language, using the learning data stored in the learning data storing unit, the learning data corresponding to the directory obtained by the directory retrieval unit.

10. A multilingual document retrieval system, comprising:

a first directory storing unit that stores a first directory structure created for a first language;

a second directory storing unit that stores a second directory structure created for a second language;

a directory relation storing unit that stores a correspondence between a directory in the first directory structure and a directory in the second directory structure;

a directory retrieval unit that decides which directory in the first directory structure has a high degree of relation with a retrieval request by the first language from a user, and the decision includes information related to levels within the first directory structure;

a translation unit that translates a document by the second language in the second directory structure to a document by the first language; and a retrieval unit that decides a document having a high degree of relation with the retrieval request by the first language from the user among documents translated to the first language by the translation unit that belong to a directory in the second directory structure corresponding to the directory decided by the directory retrieval unit.

11. The multilingual document retrieval system according to claim 10, comprising:

a learning data storing unit that stores, for each of pairs of corresponding directories stored in the directory relation storing unit, multilingual retrieval learning data that includes dictionary data of a field of the directory pair and a translation pair, wherein the translation unit translates the document by the second language in the second directory structure to a document by the first language using the learning data stored in the learning data storing unit, the learning data corresponding to the directory.

12. The multilingual document retrieval system according to claim 10, comprising:

a learning data storing unit that extracts a pair of a text by the first language and a text by the second language from a document having the text pair among documents belonging to the pair of corresponding directories stored in the directory relation storing unit, and stores the text pair as multilingual retrieval learning data, wherein the translation unit translates the document by the second language in the second directory structure to a document by the first language using the learning data stored in the learning data storing unit, the learning data corresponding to the directory.

13. A parallel corpus creating system, comprising:

a first directory storing unit that stores a first directory structure created for a first language;

a second directory storing unit that stores a second directory structure created for a second language;

a directory relation storing unit that stores a correspondence between a directory in the first directory structure and a directory in the second directory structure; and a multilingual retrieval unit that retrieves a pair of a document by the first language and a document by the second language that have a relation with each other from the pair of corresponding directories stored in the directory relation storing unit, and retrieval decision includes information related to levels within the first or second directory structure.

14. A parallel corpus creating system, comprising:

a first directory storing unit that stores a first directory structure created for a first language;

a second directory storing unit that stores a second directory structure created for a second language;

a directory relation storing unit that stores a correspondence between a directory in the first directory structure and a directory in the second directory structure;

a learning data storing unit that stores, for each of pairs of corresponding directories stored in the directory relation storing unit, multilingual retrieval learning data that includes dictionary data of a field of the directory pair and a translation pair; and a multilingual retrieval unit that retrieves a pair of a document by the first language and a document by the second language that have a relation with each other from the pair of corresponding directories stored in the directory relation storing unit, using corresponding learning data stored in the learning data storing unit and information related to levels within the first or the second directory structure.

15. A parallel corpus creating system, comprising:

a first directory storing unit that stores a first directory structure created for a first language;

a second directory storing unit that stores a second directory structure created for a second language;

a directory relation storing unit that stores a correspondence between a directory in the first directory structure and a directory in the second directory structure;

a learning data storing unit that extracts a pair of a text by the first language and a text by the second language from a document having the text pair among documents belonging to the pair of corresponding directories stored in the directory relation storing unit, and stores the text pair as multilingual retrieval learning data; and a multilingual retrieval unit that retrieves the pair of document by the first language and document by the second language that have a relation with each other from the pair of corresponding directories stored in the directory relation storing unit, using corresponding learning data stored in the learning data storing unit and information related to levels within the first or the second directory structure.

16. A multilingual document retrieval system, comprising:
- a directory relation storing unit that stores a correspondence between a directory in a first directory structure and a directory in a second directory structure;
- a directory deciding unit that decides a directory in the second directory structure corresponding to a directory in the first directory structure that has a high degree of relation with a retrieval request from a user on the directory correspondence stored in the directory relation storing unit; and
- a retrieval request issuing unit that issues a retrieval request to retrieve a document having a high degree of relation with the retrieval request from the user among documents belonging to the decided directory in the second directory structure.

17. A multilingual document retrieval system, comprising:
- a directory relation storing unit that stores a correspondence between a directory in a first directory structure created for a first language and a directory in a second directory structure created for a second language;
- a directory deciding unit that decides a directory in the second directory structure corresponding to a directory in the first directory structure that has a high degree of relation with a retrieval request by the first language from a user based on the directory correspondence stored in the directory relation storing unit, and the decision includes information related to levels within the first directory structure; and
- a retrieval request issuing unit that issues a retrieval request to retrieve a document having a high degree of relation with the retrieval request by the first language from the user among documents belonging to the decided directory in the second directory structure.

18. A multilingual document retrieval system, comprising:
- a directory relation storing unit that stores a correspondence between a directory in a first directory structure created for a first language and a directory in a second directory structure created for a second language;
- a translation unit that translates a retrieval request by the first language from a user to a retrieval request by the second language;
- a directory deciding unit that decides a directory in the second directory structure corresponding to a directory in the first directory structure that has a high degree of relation with the retrieval request by the first language from the user based on the directory correspondence stored in the directory relation storing unit; and
- a retrieval request issuing unit that issues a retrieval request to retrieve a document having a high degree of relation with the retrieval request from the user translated from the first language to the second language among documents belonging to the decided directory in the second directory structure.

19. A multilingual document retrieval system, comprising:
- a first directory storing unit that stores a first directory structure created for a first language;
- a second directory storing unit that stores a second directory structure created for a second language;
- a communication unit that communicates with the second directory storing unit;
- a directory relation storing unit that stores a correspondence between a directory in the first directory structure and a directory in the second directory structure;
- a directory retrieval unit that decides a directory in the first directory structure in response to a retrieval request by the first language from a user, and the decision includes information related to levels within the first directory structure; and
- a multilingual retrieval unit that decides a document having a high degree of relation with the retrieval request by the first language from the user among documents belonging to a directory in the second directory structure that corresponds to the directory decided by the directory retrieval unit via the communication unit.

20. A multilingual document retrieval method, comprising: storing a first directory structure created for a first language; storing a second directory structure created for a second language; storing a correspondence between a directory in the first directory structure and a directory in the second directory structure;
- deciding which directory in the stored first directory structure has a high degree of relation with a retrieval request by the first language from a user, and the decision includes information related to levels within the first directory structure; and
- deciding, by using the stored correspondence, a document having a high degree of relation with the retrieval request by the first language from the user among documents belonging to a stored directory in the stored second directory structure that corresponds to the decided directory.

21. A storage medium readable by a computer, the storage medium storing a program of instructions executable by the computer to perform a function for performing multilingual document retrieval, the function comprising the steps of:
- storing a first directory structure created for a first language;
- storing a second directory structure created for a second language;
- storing a correspondence between a directory in the first directory structure and a directory in the second directory structure;
- deciding which directory in the stored first directory structure has a high degree of relation with a retrieval request by the first language from a user, and the decision includes information related to levels within the first directory structure; and
- deciding, by using the stored correspondence, a document having a high degree of relation with the retrieval request by the first language from the user among documents belonging to a directory in the stored second directory structure that corresponds to the decided directory.

* * * * *